Dec. 21, 1937.  A. PEARLMAN  2,103,117
JACK ATTACHMENT FOR MOTOR VEHICLES
Original Filed Oct. 10, 1936
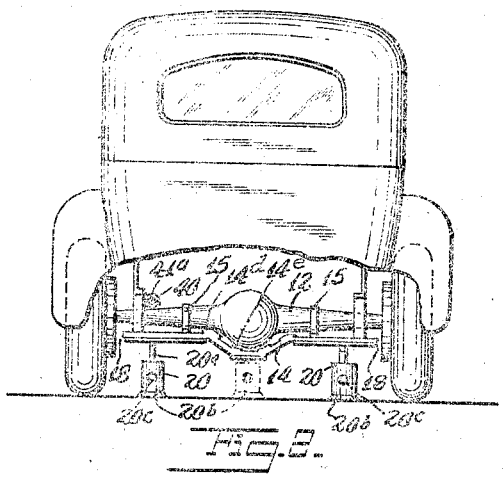
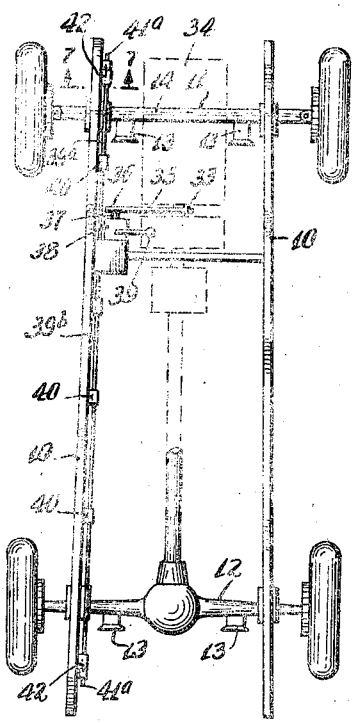
INVENTOR
Abraham Pearlman
BY
ATTORNEY Patented Dec. 21, 1937

2,103,117

UNITED STATES PATENT OFFICE 2,103,117

JACK ATTACHMENT FOR MOTOR VEHICLES

Abraham Pearlman, Brooklyn, N. Y.

Refiled for abandoned application Serial No. 104,948, October 10, 1936. This application June 23, 1937, Serial No. 149,909

4 Claims. (Cl. 254—86)

This invention relates to new and useful improvements in a jack attachment for motor vehicles. The present application is a refile of my abandoned application Serial Number 104,948, filed October 10, 1936.

The invention has for an object to provide an arrangement whereby one or more jacks may be mounted beneath the front and the rear axles of a motor vehicle. It is proposed to so arrange the attachments that the jacks may be either manually or mechanically operated from the engine of the vehicle.

Still further it is proposed to provide an arrangement which will permit the jacks to be fixedly held in desired positions or removed when desired.

Still further the invention contemplates an arrangement which will permit the jacks to be swung into the horizontal position when not in use.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of the chassis of a motor vehicle equipped with jacks according to this invention.

Fig. 2 is a rear elevational view of the motor vehicle.

Fig. 3 is a fragmentary enlarged detailed view of a portion of Fig. 2.

Fig. 4 is a sectional view taken on the line 4—4 of Fig. 3.

Fig. 5 is a sectional view taken on the line 5—5 of Fig. 4.

Fig. 6 is a sectional view taken on the line 6—6 of Fig. 4.

Fig. 7 is a sectional enlarged perspective view taken on the line 7—7 of Fig. 1.

The jack attachment for motor vehicles is used in combination with the chassis 10 of a motor vehicle. The chassis is provided with the conventional front axle 11 and rear axle 12. The jacks 13 are associated with these axles and are adapted to assume an inoperative position in the horizontal direction, directed rearwards. More particularly, a track element 14 is attached to the rear axle and a second track element 14' is attached to the front axle. These track elements are attached along the bottom sides of the axles. Each of the track elements is substantially of channel form in transverse cross section as shown in Fig. 4. The channel shape comprises a base element 14a connecting with side walls 14b, which in turn connect with in-turned edge portions 14c directed towards each other. The track element is secured to the axle by straps or bands 15 which are attached to the wall portions 14a by screws, bolts or similar fastening elements 16. A follower 17 for each of the jacks is slidably mounted on the track. This follower is substantially of T-shape having a head portion 17a engaging within the track and a projecting end portion 17b extending out from between the edge portions 14c of the track.

The tracks 14 are curved to fit the contours of the bottom of the axles. At portions 14d, 14e, etc., where there are sharp curves in the track, the track is formed with enlarged portions so that the follower may pass. With this arrangement it is possible to shift the follower from positions at one end of the track to positions at the other end of the track. It is possible to provide more than one follower within the track so that more than one jack may be associated with the track. In Fig. 2 two jacks are shown for location at the end portions of the track for lifting both wheels, simultaneously. One of these jacks may be moved to the dot and dash line position at the center to singly lift the back of the car. The purpose of having the jacks adjustable in position is that then there is a choice of the ground against which the jack is to act when the car is lifted.

There are spaces 18 between the ends of the track and portions of the motor vehicle, which spaces are of sufficient size to permit the followers 17 to be removed. Thus it is possible to remove the jacks from their association with the tracks. A jack 20 is associated with each follower 17. The association comprises a hinged connection between the stem portion 20a of the jack and the bottom end of the follower. This hinged connection is obtained by a hinge 21 arranged so that the stem 20a may be in end contact with the end portions 17b of the follower or bent at right angles thereto. The stem portion 20a of the jack projects from the body portion 20b. The jack mechanism is within the body portion and operated by a turnable projecting shaft or member 20c. The details of the jack will not be given in this specification as they form no part of the invention. The jack may be of the manually operable type or of a mechanically operable type.

At areas along the sides of each track there are clips 22. These clips are located only at positions at which it may be advisable to have the jacks operated. Each of these clips comprises a base portion 22ª attached along the inturned end portion 14ᶜ of the track, and a laterally extended resilient side portion 22ᵇ. The body 20ᵇ of the jack is formed with a groove 23 having a restricted open side adapted to engage over the resilient portion 22ᵇ of the clip. Thus the jack may be bodily moved about the hinge 21 and snapped into connected position with the clip 22 to assume and maintain a horizontal position.

A means is provided for holding the follower 17 from moving along the track when the clip 22 is functioning. This means consists of serrations 24 formed along the edge portion 14ᶜ of the track which is adjacent the cap 22 and cooperative with serrations 24′ formed upon the side portion of the end portion 17ᵇ of the follower. There is sufficient play indicated by the space 25 in Fig. 4 so that the serrations 24 and 24′ may disengage. But when the jack is in the horizontal position the clip 22 will move it sufficiently laterally to engage the serrations 24′ with the serrations 24 and thus the jack is held against sliding when the clip 22 is operating.

A means is also provided for holding the follower 17 from moving along the track when the jack is extended vertically downwards. This means is inoperative, however, when the jack is extended angularly downwards. This means comprises a serrated block 26 vertically slidably fitted in a recess 27 in the top portion of the follower 17. A stem 28 connects with the block and extends through the follower into the bottom end of the end portion 17ᵇ. When the jack is in the vertical position the top of the stem 20ª abuts the bottom of the stem 28 and forces the block 26 against a line of serrations 30 formed along the base wall 14ª of the track. When the jack is moved to an angular position the stem 28 will move downwards and the block 26 will disengage from the serrations 30.

A means is also provided for operating the jack mechanically. This means comprises a sprocket 33 mounted on the shaft of the motor of the vehicle which is generally indicated by the dot and dash lines 34. A chain 36 connects the sprocket with a sprocket pinion 36 on the shaft 37 of a clutch and transmission device 38 controlled by an operating handle 39.

This clutch and transmission device is attached upon the side of one of the arms of the chassis of the vehicle. From the front and rear faces thereof flexible tubings 39ª and 39ᵇ extend. These tubings are releasably held by several clips 40 mounted on the arm of the chassis of the vehicle. A flexible drive shaft 41 extends through the tubings 39ª and 39ᵇ and terminates in square socket portions 41ª at the outer ends of the tubings. Brackets 42 are arranged on the outer ends of the tubings 39ª and 39ᵇ by which the tubings may be manually held. The sockets 41ª are adapted to engage into complementary receiving recesses 41ᵇ formed in the turnable projecting shafts or members 20ᶜ of the jacks.

The operation of the device is as follows:—

The jacks may be permanently carried upon the axles or may be removed by shifting them to positions in which the followers disengage from the ends of the track through the spaces 18. The jacks may be shifted along the tracks to operate either at the center of the axle of the vehicle or at the end portions thereof. The jacks may be manually operated or may be connected with the jack operating mechanism for automatic operation.

To automatically operate the jacks it is merely necessary to free the tubular casings 39ª or 39ᵇ as the case may be, and to flex and bend these casings to a position which permits the socket elements 41ª and 41ᵇ to engage. Then the handle 39 is operated to cause rotations from the motor of the vehicle to be transmitted through the shaft 41 to operate the jack.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In conjunction with the axle of a motor vehicle, a track along the length thereof, a follower on said track, a jack hingedly mounted on said follower so as to be capable of extending downwards or horizontally, a clip for releasably holding said jack in the horizontal position, means for holding said follower from moving along said track when said clip operates, and means for holding said follower from moving along said track when said jack is extended vertically downwards.

2. In conjunction with the axle of a motor vehicle, a track along the length thereof, a follower on said track, a jack hingedly mounted on said follower so as to be capable of extending downwards or horizontally, a clip for releasably holding said jack in the horizontal position, means for holding said follower from moving along said track when said clip operates, and means for holding said follower from moving along said track when said jack is extended vertically downwards, said clip comprising an end portion attached on said track and a side portion resiliently constructed and adapted to coact with a receiving groove in the body portion of said jack.

3. In conjunction with the axle of a motor vehicle, a track along the length thereof, a follower on said track, a jack hingedly mounted on said follower so as to be capable of extending downwards or horizontally, a clip for releasably holding said jack in the horizontal position, means for holding said follower from moving along said track when said clip operates, and means for holding said follower from moving along said track when said jack is extended vertically downwards, said clip comprising an end portion attached on said track and a side portion resiliently constructed and adapted to coact with a receiving groove in the body portion of said jack, said means for holding the follower when the clip operates comprising serrations on a portion of the follower coacting with serrations on the track due to the resilient urging of said clip.

4. In conjunction with the axle of a motor vehicle, a track along the length thereof, a follower on said track, a jack hingedly mounted on said follower so as to be capable of extending downwards or horizontally, a clip for releasably holding said jack in the horizontal position, means for holding said follower from moving along said track when said clip operates, and means for holding said follower from moving along said track when said jack is extended vertically downwards, said clip comprising an end portion attached on said track and a side portion resiliently constructed and adapted to coact with a receiving groove in the body portion of said jack, said means for holding the follower when the clip operates comprising serrations on a portion of the follower coacting with serrations on the track due to the resilient urging of said clip, said latter-mentioned holding means, comprising a block movably mounted on said follower and engageable against serrations upon said track, and a stem connected with said block and extending through said follower to a position in which it will abut the stem of the jack to be urged into an operative position by the stem portion of the jack when the jack is extended vertically downwards.

ABRAHAM PEARLMAN.